(12) United States Patent
Eygelaar

(10) Patent No.: US 8,394,153 B2
(45) Date of Patent: Mar. 12, 2013

(54) APPARATUS FOR PRODUCING NITRATE GRANULES

(75) Inventor: Johannes Petrus Gysbert Eygelaar, Vanderbijlpark (ZA)

(73) Assignee: Omnia Fertilizer Limited, Epsom Downs (ZA)

(*) Notice: Subject to any disclaimer, the term of this patent is extended or adjusted under 35 U.S.C. 154(b) by 510 days.

(21) Appl. No.: 12/684,082

(22) Filed: Jan. 7, 2010

(65) Prior Publication Data

US 2010/0117247 A1 May 13, 2010

Related U.S. Application Data

(62) Division of application No. 10/536,412, filed as application No. PCT/IB03/05360 on Nov. 24, 2003, now Pat. No. 7,727,485.

(30) Foreign Application Priority Data

Nov. 26, 2002 (ZA) .................................. 2002/9601
Apr. 11, 2003 (ZA) .................................. 2003/2874

(51) Int. Cl.
*B01D 9/00* (2006.01)

(52) U.S. Cl. ...................................... 23/295 R; 422/142

(58) Field of Classification Search .................. 422/142, 422/245.1; 23/295 R
See application file for complete search history.

(56) References Cited

FOREIGN PATENT DOCUMENTS

| EP | 1 142 487 | 10/2001 |
|----|-----------|---------|
| WO | WO 95/13865 | 5/1995 |
| WO | WO 01/43861 | 6/2001 |
| WO | WO 01/83374 | 11/2001 |

*Primary Examiner* — Edward Johnson
(74) *Attorney, Agent, or Firm* — Birch, Stewart, Kolasch & Birch, LLP

(57) ABSTRACT

An apparatus for producing nitrate granules includes a first fluidized bed which is supplied with air that has been conditioned to a relative humidity of less than 30% at 40° C. and heated to a temperature of 40° C. to 100° C. One or more spray nozzles are provided for spraying a nitrate melt into the first fluidized bed to form nitrate granules. The apparatus also includes a second fluidized bed which is in direct communication with the first fluidized bed. Nitrate granules formed in the first fluidized bed flow directly to the second fluidized bed where they are cooled to a temperature of less than 60° C. The nitrate granules produced by the apparatus and process of the invention are spherical in shape, hard and dry and do not break down easily during handling. The apparatus according to the invention is compact, capable of very high product rates, and can be operated by one operator.

10 Claims, 1 Drawing Sheet

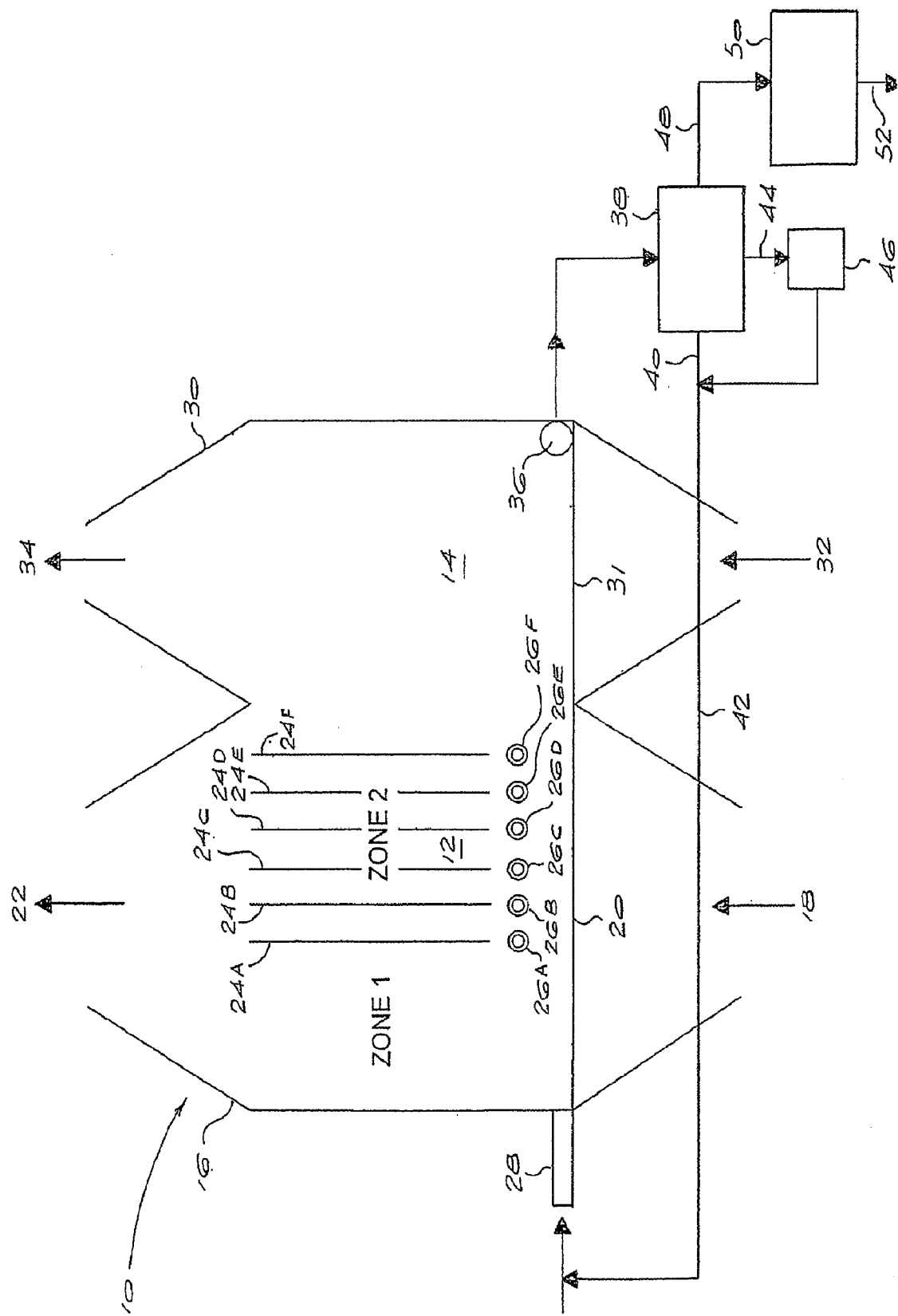

APPARATUS FOR PRODUCING NITRATE GRANULES

CROSS-REFERENCE TO RELATED APPLICATIONS

This application is a Divisional of co-pending application Ser. No. 10/536,412 filed on Dec. 16, 2005, now U.S. Pat. No. 7,727,485 and for which priority is claimed under 35 U.S.C. §120; and this application claims priority to International Application No. PCT/IB2003/005360 filed on Nov. 24, 2003, South African Application 2003/2874 filed on Apr. 11, 2003, and South African Application 2002/9601 filed on Nov. 26, 2002 under U.S.C. §371; the entire contents of all are hereby incorporated by reference.

BACKGROUND OF THE INVENTION

This invention relates to an apparatus for producing nitrate granules.

International Patent Publication No. WO 01/83374 discloses a method for producing nitrate granules, particularly calcium nitrate granules. A calcium nitrate melt is sprayed into a re-circulating bed of a first fluidized bed granulator, where the re-circulating bed is supplied with air that has been conditioned and heated to a temperature of between 60° C. to 100° C. Calcium nitrate granules formed in the granulator are introduced to a primary cooler in the form of a second fluidized bed where the granules are cooled to from 50° C. to 60° C. by conditioned air. The granules are sorted in a sorter and then cooled in a secondary cooler to a temperature of less that 40° C., before being bagged. The granules so produced are hard, dry and spherical in shape and do not break down easily during handling.

It is an object of this invention to provide a more compact and improved apparatus for producing nitrate granules.

SUMMARY OF THE INVENTION

According to a first aspect of the invention there is provided an apparatus for producing granules, typically nitrate granules, the apparatus including:

a first fluidized bed which is supplied with air that has preferably been conditioned to a relative humidity of less than 30% at 40° C. and heated to a temperature of 40° C. to 100° C., and one or more spray nozzles for spraying a nitrate melt into the first fluidized bed to form nitrate granules; and a second fluidized bed which is in direct communication with the first fluidized bed, for cooling nitrate granules formed in the first bed to a temperature of 60° C. or less, preferably 30° C. to 60° C.; wherein the first fluidized bed includes a conditioning Zone having no spray nozzles, for receiving and conditioning seeding particles, and a granulating Zone having at least one nozzle, for receiving conditioned particles from the conditioning Zone and forming the particles into granules.

Optionally, the granulating Zone may include a plurality of barriers in the form of vertically oriented planar baffles. Typically, each spray nozzle is located below a baffle.

Advantageously, the spray nozzles are pressurised with compressed air which has been heated to a temperature of 40° C. to 70° C.

The spray nozzles typically provide a flat spray pattern which is perpendicular to the flow of air in the first fluidized bed.

The first fluidized bed may have a surface area of 10.8 m$^2$ to 2 m$^2$, preferably 1 m$^2$ to 1.6 m$^2$, typically about 1.4 m$^2$.

The conditioning Zone of the first fluidized bed may have a length of 0.5 m-1 m, typically about 0.7 m, and the granulating Zone of the first fluidized bed may have a length of 1.4 m-2 m, typically about 1.7 m.

The second fluidized bed may have a surface area of 0.4 m$^2$ to 1 m$^2$, preferably 0.6 m$^2$-0.9 m$^2$, typically about 0.85 m$^2$.

Where the apparatus is for producing calcium nitrate granules, the air supplied to the first fluidized bed is preferably heated to a temperature of 60° C. to 100° C., typically 80° C. to 100° C., and the air supplied to the second fluidized bed is preferably heated to a temperature of 30° C. to 60° C.

In a preferred apparatus for producing calcium nitrate granules the air supplied to the first fluidized bed is heated to a temperature of about 90° C. and has a relative humidity of less than 10%.

Where the apparatus is for producing magnesium nitrate granules, the air supplied to the first fluidized bed is preferably heated to a temperature of 50° C. to 100° C., typically 50° C. to 70° C., and the air supplied to the second fluidized bed is preferably heated to a temperature of 30° C. to 50° C.

In a preferred apparatus for producing magnesium nitrate granules the air supplied to the first fluidized bed is heated to a temperature of about 65° C. and has a relative humidity of less than 15%.

Where the apparatus is for producing ammonium nitrate/calcium nitrate granules, the air supplied to the first fluidized bed is preferably heated to a temperature of 50° C. to 100° C., typically 50° C. to 80° C., and the air supplied to the second fluidized bed is preferably heated to a temperature of 30° C. to 50° C.

In a preferred apparatus for producing ammonium nitrate/calcium nitrate granules the air supplied to the first fluidized bed is heated to a temperature about 70° C. and has a relative humidity of less than 15%.

According to a second aspect of the invention there is provided a method for producing nitrate granules, in a fluidized bed granulator, wherein recycled particles from the granulator are first passed through a fluidized bed conditioning Zone having no spray nozzles, before being passed to a fluidized bed granulating Zone which includes at least one spray nozzle.

Advantageously, the fluidizing air supplied to the conditioning Zone has the same properties as the fluidizing air which is supplied to the granulating Zone. Typically, the fluidizing air supply to the conditioning and granulating Zones has been conditioned to a relative humidity of less than 30% at 40° C. and heated to a temperature of 40° C. to 100° C.

Preferably, the conditioning Zone and granulating Zone are located on a first fluidized bed.

Granules formed in the first fluidized bed may be passed directly to a second fluidized bed where the granules are cooled to a temperature of 60° C. or less.

Granules from the second fluidized bed are typically sent to a sorter from which undersized granules are recycled to the first fluidized bed as seeding particles. Oversized granules from the sorter are first crushed and then also recycled to the first fluidized bed as seeding particles.

BRIEF DESCRIPTION OF THE DRAWING

FIG. 1 is a schematic representation of an apparatus and process according to the invention for producing nitrate granules.

DESCRIPTION OF EMBODIMENTS

This invention relates to an improved apparatus for producing granules, in particular nitrate granules. The apparatus may be used for the formation of any nitrate granules including calcium nitrate granules, magnesium nitrate granules, potassium nitrate granules, other salts of nitrates such as ammonium nitrate (high dense and low dense), mixes of ammonium nitrate and calcium nitrate, and mixes of calcium and magnesium nitrate (or any combination thereof), and water soluble N, P, K granules with or without micro elements.

With reference to FIG. 1, a granulating apparatus according to the invention is shown generally by the numeral 10. The apparatus 10 includes a first and second fluidized bed 12 and 14 which are in direct communication with one another. "Direct communication" and "directly" means that there is no barrier between the fluidized beds and granules formed in the first fluidized bed 12 flow to the second fluidized bed 14 without the need of a conduit or a conveyor.

The first fluidized bed 12 is housed in a granulator 16 defined by a steel cabinet. The first fluidized bed is located above a horizontally oriented perforated plate 20. A stream of air 18 is pumped into the bottom of the granulator 16, through the perforated plate 20 into the fluidized bed 12 and extracted at a top exit 22, where after the air is passed through a scrubber and released into the atmosphere.

The perforated plate 20 has a surface area of $0.8 \, m^2$ to $2 \, m^2$, preferably $1 \, m^2$ to $1.6 \, m^2$, typically about $1.4 \, m^2$, and the perforations have a diameter of 1 to 3 mm, typically 1.6 mm. The first fluidized bed 12 is divided into two zones which are shown as Zone 1 and Zone 2. Zone 1 may be from 0.5 m-1 m, typically about 0.7 m in length and Zone 2 may be from 1.4 m-2 m, typically about 1.7 m in length. Zone 1 is a conditioning Zone and Zone 2, which includes a plurality of (in this case 6) atomized nozzles 26A-26F is a granulation Zone. The air atomized nozzles 26A-26F are arranged to deliver a nitrate melt in a flat spray pattern perpendicular to the flow of air 18 through the perforated plate 20. Each nozzle 26A-26F is provided with a valve (not shown) so that the spray of a nozzle can be switched off when a lower out-put is required. Optionally, Zone 2 may include a plurality of barriers, in this case six vertically orientated planar baffles 24A-24F. Each baffle 24A-24F is located above a nozzle 26A-26F. The size of each baffle 24A-24F is selected to ensure constant mass flow per cross-sectional area.

A feed screw 28 is provided for feeding seeding particles into the granulator 16.

The second fluidized bed 14 is housed in a primary cooler 30 defined by a steel cabinet. The second fluidized bed is located above a horizontally oriented perforated plate 31. The perforated plate 31 has a surface area of $0.4 \, m^2$ to $1 \, m^2$, preferably $0.6 \, m^2$ to $0.9 \, m^2$, typically about $0.85 \, m^2$. A stream of air 32 is pumped into the bottom of the primary cooler 30, through the perforated plate 31 and extracted at a top exit 34, whereafter the air is passed through a scrubber and released to the atmosphere. The primary cooler 30 has an inspection window (not shown) through which the granules can be observed. An operator can see from the size of the granules passing through the primary cooler 30 whether the apparatus is operating correctly.

Nitrate granules are removed from the primary cooler 30 by a screw 36. The granules removed by the screw 36 are sent to a sorter 38. Undersize fine particles 40 from the sorter 38 are recycled via a chute 42 to the feed screw 28 as seeding particles for the first fluidized bed 12. Oversized granules 44 are sent to a crusher 46, crushed, and also recycled via the chute 42 the feed screw 28 as seeding particles. If the recycled particles are not passed through the primary cooler 30 for cooling prior to recycling, a heat imbalance would result in the fluidized bed 12 when the particles are recycled. On-size particles 48 are sent to a secondary cooler 50 where they are cooled to a temperature of approximately 35° C. and then sent for packaging 52.

In a first embodiment of the invention, which relates to the production of calcium nitrate granules, ambient air is drawn into a condenser and conditioned to remove the moisture of the air. The conditioned air preferably has a relative humidity of less than 30% at 40° C. The conditioned air is then passed through a steam-heater which heats the air to a temperature of 60° C. to 100° C., typically 80° C. to 100° C. The conditioned, heated air 18, is then pumped into the granulator 16 to form the first fluidized bed 12. In a preferred embodiment, the heated air 18 is at a temperature of 90° C. and has a relative humidity of less than 10%.

A liquid calcium nitrate melt is pumped into the granulator 16 through the nozzles 26. The calcium nitrate melt is produced by reacting a calcium source, for example calcium carbonate with nitric acid. In this embodiment of the invention a 60% nitric acid solution is neutralized with limestone ($CaCO_3$). A slight excess of nitric acid is used to convert all of the lime. Undissolved impurities are then removed by filtration and excess nitric acid in the solution is neutralized with limestone. This neutralization with limestone ensures that the granules are white in color. It is possible to neutralize the solution with ammonia. However, such a solution is more difficult to filter which may lead to discoloration of the granules. After neutralization with limestone, ammonium nitrate is added to provide a 1 mole concentration of ammonium nitrate in solution. The liquid calcium nitrate, which has a concentration of 70%-80% (m/m), is passed to a concentration unit and is concentrated to 85%-90% (m/m), with a 10%-15% free moisture content, using steam at 8-10 bar (0.8-1 MPA) pressure. The concentrated calcium nitrate melt is then injected into the first fluidized bed 12 of the granulator 16 via spray nozzles 26 at a temperature of 130° C. to 140° C. The liquid is forced through the spray nozzles by the action of a pump. In addition to pressurization by the pump, the liquid is pressurized by compressed air at a pressure of 4-7 bar (0.4-0.7 MPA). The compressed air is heated at a temperature of from 40° C. to 70° C. The heated compressed air retards the crystallization of the melt which promotes layering of the granules and enhances the formation of the preferred spherical granules of the invention.

Calcium nitrate seeding particles which have a size of approximately 1 to 5 mm are fed into the granulator 16 by the feed screw 28. The seeding particles pass through Zone 1 of the first fluidized bed 12 where they are preconditioned, i.e. heated by the hot air 18 and also dried. This preconditioning step ensures optimal layering on the seeds to ensure hardness, smoothness and sphericity of the granules when entering Zone 2. When the seeding particles enter Zone 2 of the first fluidized bed 12, liquid calcium nitrate sprayed from the nozzles 26 is deposited onto the calcium nitrate seeding particles, to form granules of calcium nitrate. The granules of calcium nitrate are very hygroscopic. The conditioned heated air 18, which has a relative humidity of less than 10% at 90° C., is very important. If the air 18 was not conditioned, the granules may absorb moisture from the air, become sticky, and agglomerate. In Zone 2, atomized droplets of melt spray contact particles in the fluidized bed and form a layer on the particles, thus causing uniform growth size. The configuration of the baffles 24A-24F can optimize contact between droplets and particles and prevent back flow, which reduces over granulation and oversized particles.

Granules of calcium nitrate formed in the first fluidized bed 12 flow directly into the second adjacent fluidized bed 14 of the primary cooler 30. The primary cooler 30 cools the granules down to below 60° C., typically about 50° C. to 60° C., with conditioned air 32 which has been heated to a temperature of 30° C. to 40° C. Although, generally, the particles are cooled to between 50° C. and 60° C., it is possible to cool the particles to a lower temperature above 30° C. because, in the present configuration of the apparatus 10, cool seeding particles return to the feeder 28 and may be heated to the required temperature in the preconditioning Zone 1. If the granules were not passed through the primary cooler 30 for cooling, a heat imbalance would result when particles are recycled. Also, the granules would become too hot, resulting in melting or softening of the granules. The primary cooler 30 also makes it possible to increase the production capacity of the granulator 16, as the flow rate of hot melt at 130° C. to 140° C. into the granulator 16 can be increased.

Calcium nitrate granules from the primary cooler 30 are removed by a screw 36. The granules removed by the screw 36 are sorted in the sorter 38 and fine particles are recycled to the feed screw 28 as seeding particles. Oversized granules are crushed in the crusher 46 and also recycled to the feed screw 28. On-size granules (90% from 2 mm to 4 mm) are sent from the sorter 38 to the secondary cooler 50 for cooling and then for packaging.

In a second embodiment of the invention, which relates to the production of magnesium nitrate granules, ambient air is drawn into a condenser and conditioned to remove the moisture of the air. The conditioned air preferably has a relative humidity of less than 30% at 40° C. The conditioned air is then passed through a steam-heater which heats the air to a temperature of 50° C. to 100° C., typically 50° C. to 70° C. The conditioned, heated air 18, is then pumped into the granulator 16 to form the first fluidized bed 12. In a preferred embodiment, the heated air 18 is at a temperature of 65° C. and has a relative humidity of less than 15%.

A liquid magnesium nitrate melt is pumped into the granulator 16 through the nozzles 26. The magnesium nitrate melt is produced by reacting a magnesium source, for example magnesium oxide, with nitric acid. In this embodiment of the invention a 60% nitric acid solution is used. Undissolved impurities are removed from the liquid by filtration. The liquid magnesium nitrate, which has a concentration of 45%-60% (m/m), is passed to a concentration unit and is concentrated to 90%-95% (m/m), with a free moisture content of 5-10% using steam at 8-10 bar (0.8-1 MPA) pressure. The concentrated magnesium nitrate melt is then injected into the first fluidized bed 12 of the granulator 16 via spray nozzles 26 at a temperature of 135° C. to 145° C. The liquid is forced through the spray nozzles by the action of a pump. In addition to pressurization by the pump, the liquid is pressurized by compressed air at a pressure of 4-7 bar (0.4-0.7 MPA). The compressed air is heated at a temperature of from 40° C. to 70° C. The heated compressed air retards the crystallization of the melt which promotes layering of the granules and enhances the formation of the preferred spherical granules of the invention.

Magnesium nitrate seeding particles which have a size of approximately 1 to 5 mm are fed into the granulator 16 by the feed screw 28. The seeding particles pass through Zone 1 of the first fluidized bed 12 where they are preconditioned, i.e. heated by the hot air 18 and also dried. This preconditioning step ensures optimal layering on the seeds to ensure hardness, smoothness and sphericity of the granules when entering Zone 2. When the seeding particles enter Zone 2 of the first fluidized bed 12, liquid magnesium nitrate sprayed from the nozzles 26 is deposited onto the magnesium nitrate seeding particles, to form granules of magnesium nitrate. The granules of magnesium nitrate are very hygroscopic. The heated conditioned air 18, which has a relative humidity of less than 15% at 65° C. is very important. If the air 18 was not conditioned, the granules may absorb moisture from the air, become sticky, and agglomerate. In Zone 2, atomized droplets of melt spray contact particles in the fluidized bed and form a layer on the particles, thus causing uniform growth size. The configuration of the baffles 24A-24C can optimize the contact between droplets and particles and, prevent back flow, which reduces over granulation and oversized particles.

Granules of magnesium nitrate formed in the first fluidized bed 12 flow directly into the second, adjacent fluidized bed 14 of the primary cooler 30. The primary cooler 30 cools the granules down to below 60° C., typically about 40° C. to 50° C., with conditioned air 32 which has been heated to a temperature of 30° C. to 40° C. Typically, the air 32 is at a temperature of 40° C. and has a relative humidity of 22%. If the granules were not passed through the primary cooler 30 for cooling, a heat imbalance would result when particles are recycled. Also, the granules would become too hot, resulting in melting or softening of the granules. The primary cooler 30 also makes it possible to increase the production capacity of the granulator 16, as the flow rate of hot melt at 135° C. to 145° C. into the granulator 16 can be increased.

Magnesium nitrate granules from the primary cooler are removed by the screw 36. The granules removed by the screw 36 are sorted in the sorter 38 and fine particles are recycled to the feed screw 28 as seeding particles. Oversize granules are crushed in the crusher 46 and also recycled to the feed screw 28. On-size granules (from 2 mm to 5 mm) are sent from the sorter 38 to the secondary cooler 50 for cooling and then packaging.

In a third embodiment of the invention, which relates to the production ammonium nitrate/calcium nitrate granules, a batch process is used to produce a calcium nitrate/ammonium nitrate solution. Various ratios of calcium nitrate and ammonium nitrate may be prepared, with the calcium nitrate for example ranging from 10-50%. The resulting solution is concentrated to remove water and then transferred to storage tanks.

This solution is then concentrated at atmospheric pressure by evaporating water. This may be accomplished by passing steam (8 bar/0.8 Mpa) coils in a concentrator tank. With reference to the Figure, the concentrated solution (at 82-90% concentration), with a temperature of 105-120° C. is pumped into the granulator 16 of the apparatus 10 through five nozzles 26 at a rate of 2.0-3.0 t/hr. The granulator 16 houses a first fluidized bed having a total fluidizing surface area 20 of 1 m$^2$ with 8% apertures of 1.5 mm diameter holes. The air 18 supplied to this fluidized bed has a temperature of 70° C. and a relative humidity of less than 15%.

Ammonium Nitrate/Calcium Nitrate granules formed in the granulator 16 flow directly to the primary cooler 30, which houses a second fluidized bed having a total fluidizing surface area of 0.65 m$^2$. This second fluidized bed has the same apertures as the first fluidized bed. Conditioned air 32 supplied to the second fluidized bed is at a temperature of 40° C. and a relative humidity of 21.7% at 40° C.

Granules from the primary cooler 30, with particle sizes ranging from 0.5 mm to 10 mm, are then sent to a sorter. The granules are sorted using a double deck screen with apertures sized between 2-5 mm. As with the abovementioned methods, undersized particles are recycled to the first fluidized bed 12 and oversized particles are crushed to a size of below 2.5 mm and also returned to the first fluidized bed, as seeding particles. The final product is passed into the secondary cooler with a total fluidizing surface of 0.6 m$^2$ and the same aperture size as the other fluidized beds. The final product leaving the secondary cooler has a temperature of 35° C. The final product is bagged directly into 1 ton (1000 kg) bags. These bags are then transported to a bagging unit where they were bagged into 25 kg bags.

The nitrate granules produced by the apparatus and process of the invention are spherical in shape, hard and dry and do not break down easily during handling. Typically the granules have an average hardness of 3.5 kg to 4.5 kg. The hardness is determined by applying a force measured in kg onto a single granule in the size range 2-4 mm, with the hardness result being the force in kilograms that results in the fracture of the granule, i.e. the yield point. The granules also have a low caking tendency, are easily soluble in water and have a uniform particle size distribution.

A main advantage of the apparatus 10 according to the invention is that it is compact. The granulation section of a plant can fit into a space of 80 m$^2$. Although it is compact, the apparatus 10 is capable of very high production rates of 3-5 tons/hr per m$^2$ of granulator perforated plate area. Thus, the apparatus shown in the Drawing and described herein can run at a production rate of 8 tons/hr. Although the apparatus can be run at very high production rates, if necessary the production rate can be lowered by switching one or more of the nozzles off during periods of low demand. Lastly, the whole granulation unit can be operated by one operator.

The invention will now be described in more detail in the following non-limiting Examples.

EXAMPLE 1

A first liquid calcium nitrate solution was produced in a continuous process by neutralising nitric acid with calcium carbonate. 8.5 tons/hour of a 60% nitric acid solution was neutralized with 4.1 tons/hour calcium carbonate. A slight excess of nitric acid was used. The solution was then passed through a filter leaf press to remove insoluble matter and was then neutralized with 0.12 tons/hour ammonia to form ammonium nitrate in the solution. The mole ratio of calcium nitrate to ammonium nitrate in the solution was 5:1. The first solution had the following composition:

Calcium: 14.7% (m/m),
Nitrogen in ammoniacal form: 1.0% (m/m),
Nitrogen in nitrate form: 11.3% (m/m).

The first solution mentioned was then concentrated at atmospheric pressure by evaporating water from the solution using steam at a pressure of 8 bar (0.8 MPA) through steam coils in a concentrator tank, to form a second, concentrated, solution. The second solution had a water content of 13.2% (excluding water of crystallisation) and a composition of:

Calcium: 16.4% (m/m),
Nitrogen in ammoniacal form: 1.2% (m/m),
Nitrogen in nitrate form: 12.8% (m/m).

The second solution reaches a temperature of 139° C. during the evaporation step.

With reference to the Figure, the second solution was then pumped into a granulator 16 through four air atomizing nozzles 26 at a rate of 4.5 tons/hour. The granulator 16 was supplied with heated conditioned air 18. Conditioned air, which had been passed through a radiator-type condenser, had a relative humidity of 28% at 40° C., was heated to a temperature of 90° C. to provide heated conditioned air 18 with a relative humidity of less than 10%. The granulator 16 housed a first fluidized bed with a total fluidizing surface 20 of 1.00 m 2 with 8% apertures of 1.5 mm diameter holes.

Calcium nitrate granules produced in the granulator 16 flowed directly to a primary cooler 30 having a second fluidized bed with a total fluidizing surface of 0.65 m$^2$ and the same apertures as the first fluidized bed. The second fluidized bed was supplied with heated conditioned air from the radiator-type condenser. The conditioned air had a relative humidity of 28% at 40° C., and was heated to a temperature of 40° C.

Granules from the primary cooler 30, with particle sizes ranging from 0.5 mm to 10 mm, were then sent to a sorter. The granules were sorted using a double deck screen with apertures sized between 2-5 mm. Undersized particles are recycled to the first fluidized bed and oversized particles are crushed to a size of below 2.5 mm and also returned to the first fluidized bed, as seeding particles. The final product was passed into the secondary cooler with a total fluidizing surface of 0.6 m$^2$ and the same aperture site as the other fluidized beds. The final product leaving the secondary cooler had a temperature of 35° C. The final product was bagged directly into 1 ton (1000 kg) bags. These bags were transported to a bagging unit where they were bagged into 25 kg bags. The final product composition was:

Calcium: 18.4% (m/m)
Nitrogen in ammoniacal form: 1.45% (m/m)
Nitrogen in nitrate form: 14.05% (m/m) 1 ton=1×10$^3$ kg

EXAMPLE 2

A batch process is used to produce a magnesium nitrate solution. 1.8 t of magnesium oxide was reacted with 5.4 m$^3$ of 60% nitric acid and 7 m$^3$ of water. The resulting solution was then passed through a filter leaf press to remove any insoluble matter and then transferred to storage tanks. The following composition was obtained:

Magnesium: 5.33% (m/m),
Nitrogen 6.14% (m/m).

This solution was then concentrated at atmospheric pressure by evaporating water. This was accomplished by passing steam (8 bar/0.8 Mpa) coils in a concentrator tank. With reference to the Figure, the second solution at 95% concentration, with a temperature of 135-145° C. was pumped into the granulator 16 of the apparatus 10 through five nozzles 26 at a rate of 1.5 t/hr The granulator 16 housed a first fluidized bed having a total fluidizing surface area 20 of 1 m$^2$ with 8% apertures of 1.5 mm diameter holes. The air 18 supplied to this fluidized bed had a temperature of 65° C. and had a relative humidity of less than 15%.

Magnesium nitrate granules from the granulator 16 flowed directly to the primary cooler 30, which housed a second fluidized bed having a total fluidizing surface area of 0.65 m$^2$. This second fluidized bed also had the same apertures as the first fluidized bed. Conditioned air 32 supplied to the second fluidized bed was at a temperature of 40° C. and had a relative humidity of 21.7% at 40° C.

Granules from the primary cooler 30, with particle sizes ranging from 0.5 mm to 10 mm, were then sent to the sorter. The granules were sorted using a double deck screen with apertures sized between 2-5 mm. Undersized particles are recycled to the first fluidized bed and oversized particles are crushed to a size of below 2.5 mm and also returned to the first fluidized bed, as seeding particles. The final product was passed into the secondary cooler with a total fluidizing surface of 0.6 m$^2$ and the same aperture site as the other fluidized beds. The final product leaving the secondary cooler had a temperature of 35° C. The final product was bagged directly into 1 ton (1000 kg) bags. These bags were transported to a bagging unit where they were bagged into 25 kg bags. The final product composition was:

Magnesium 9.45% (m/m),
Nitrogen 10.90% (m/m).

What is claimed is:

1. A method for producing nitrate granules in a fluidized bed granulator having a granulation zone, said granulation zone having spray nozzles which are arranged to spray a nitrate melt into the granulation zone to form granules, wherein recycled seeding particles from the granulator are preconditioned by heating and drying in a conditioning zone having none of the spray nozzles, before passing the recycled seeding particles to the granulation zone.

2. The method as claimed in claim 1, wherein the recycled seeding particles are preconditioned with hot air.

3. The method as claimed in claim 2, wherein the hot air has relative humidity of less than 30% at 40° C.

4. The method as claimed in claim 3, wherein the hot air has a temperature of 40° C. to 100° C.

5. The method as claimed in claim 4, wherein the conditioning zone is within the fluidized bed granulator.

6. A method for producing nitrate granules in a fluidized bed granulator, the granulator being supplied with a flow of fluidizing air for forming a fluidized bed within the granulator and the granulator having spray nozzles in one portion thereof for spraying a nitrate melt into the fluidized bed; wherein the spray nozzles are arranged to provide a flat spray pattern of nitrate melt which is perpendicular to the flow of fluidizing air in the fluidized bed,
wherein recycled seeding particles from the granulator are preconditioned by heating and drying in a conditioning zone in another portion of the granulator having none of the spray nozzles, before passing the recycled seeding particles to the one portion of the granulator having the spray nozzles.

7. The method as claimed in claim 6, wherein the nitrate melt supplied to the nozzles is pressurized to a pressure of 4-7 bar (0.4-0.7 MPa).

8. The method as claimed in claim 7, wherein the nitrate melt supplied to the nozzles is pressurized with compressed air.

9. The method as claimed in claim 8, wherein the compressed air is heated at a temperature of from 40° C. to 70° C.

10. A fluidized bed granulator for producing nitrate granules adapted to be supplied with a flow of fluidizing air for forming a fluidized bed therein, the granulator comprising:
spray nozzles in one portion of the granulator for spraying a nitrate melt into the fluidized bed; wherein the spray nozzles in the one portion of the granulator are arranged to provide a flat spray pattern of nitrate melt which is perpendicular to the flow of fluidizing air in the fluidized bed, and
a conditioning zone formed in another portion of the granulator having none of the spray nozzles; wherein recycled seeding particles from the granulator are preconditioned by heating and drying in the conditioning zone, before being passed to the one portion of the granulator having spray nozzles.

* * * * *